United States Patent
Hearn et al.

[15] 3,687,198
[45] Aug. 22, 1972

[54] HIGH DENSITY MISCIBLE FLUID INJECTION WITH AQUIFER ENCROACHMENT

[72] Inventors: Charles L. Hearn, Tulsa, Okla.; James L. Relph, Midland, Tex.

[73] Assignee: Cities Service Oil Company

[22] Filed: Jan. 30, 1970

[21] Appl. No.: 7,060

[52] U.S. Cl. ..............................166/274, 166/263
[51] Int. Cl. ...............................................E21b 43/22
[58] Field of Search..............166/263, 268, 273–275, 166/306

[56] References Cited

UNITED STATES PATENTS

| | | | |
|---|---|---|---|
| R24,873 | 9/1960 | Lindauer | 166/268 |
| 3,215,198 | 11/1965 | Willman | 166/268 X |
| 3,312,278 | 4/1967 | Warden | 166/263 |
| 3,084,743 | 4/1963 | West et al. | 166/273 |

*Primary Examiner*—Stephen J. Novosad
*Attorney*—J. Richard Geaman

[57] ABSTRACT

A method of controlling water influx and improving oil recovery by injecting a high density miscible fluid, such as carbon dioxide, at the water-oil contact is described. The fluid must be miscible with the oil and must have a density intermediate between that of water and the reservoir oil. A sufficient amount of fluid is injected to form a bank between the oil and encroaching water. As oil is produced from the reservoir, water influx from the aquifer displaces this bank of fluid, which in turn displaces the oil. Due to the miscibility of the fluid with the reservoir oil, a low residual oil saturation remains behind the displacement front. The density of the fluid is intermediate to that of the water and the reservoir oil restricting the bank of fluid therebetween and allowing little tendency for the fluid to bypass or override the oil and migrate to the structurally higher portions of the reservoir.

5 Claims, 6 Drawing Figures

PATENTED AUG 29 1972

CHARLES L. HEARN
JAMES L. RELPH
INVENTORS.

BY [signature]

CHARLES L. HEARN,
JAMES L. RELPH,
INVENTORS.

BY

ATTORNEY.

CHARLES L. HEARN,
JAMES L. RELPH,
INVENTORS.

BY *J. Richard Geaman*

ATTORNEY.

CHARLES L. HEARN,
JAMES L. RELPH,
INVENTORS ns
HIGH DENSITY MISCIBLE FLUID INJECTION WITH AQUIFER ENCROACHMENT

BACKGROUND OF THE INVENTION

This invention relates to the recovery of oil from subterranean reservoirs. More particularly it relates to the secondary recovery of the oil from subterranean reservoirs by the introduction of an oil miscible fluid between an encroaching aquifer water body and the residual oil contained within the reservoir, so that a third region of miscible fluid is formed which segregates the oil zone and water regions of the influxed reservoir.

Many oil reservoirs are bounded on portions or their entire periphery, by water-bearing rocks called aquifers. Production of oil causes a pressure drop in the reservoir and in response to this pressure drop, the aquifer reacts to offset or retard pressure decline by providing for a source of water influx into the reservoir. The contact or interface between the water in the aquifer and the oil in the reservoir will normally be in a horizontal plane. This horizontal plane is due to the gravity segregation caused by the different densities of the water and the oil. Often there may be some degree of tilt of the contact plane due to water movement in the aquifer and capillary pressure effects. Oil is nearly always less dense than water so that oil is above and the water below the plane of contact. The water influx into a reservoir may be edgewater or bottomwater. Edgewater is that water which encroaches from the side, whereas bottomwater indicates that the oil is underlain by a water zone of sufficient thickness so that the water movement is essentially vertical. In the case of edgewater drive, water movement will have both horizontal and vertical components. In both cases, however, the oil because of its lower density will commonly be structurally higher than the water contained within the reservoir.

In some instances, water influx is considered a favorable occurrence since it may act as an efficient waterflood maintaining reservoir pressure and eventually displacing oil down to normal waterflood residual oil content. On the other hand, water influx may introduce problems detrimental to the overall economic performance of the reservoir. As oil is produced from the reservoir and water influx proceeds, wells close to the water-oil contact begin to produce water in continually increasing amounts. This produced water often has to be pumped from the wells. In deep reservoirs the added pumping, or lifting cost may be a significant factor in the economics of the oil production. Eventually the producing water to oil ratio of wells in the path of water influx will reach the point where lifting costs or economics will exceed the value of the produced oil. This economic event may make it a necessity to abandon the well. Also, in some cases, the size of the aquifer is not sufficient to maintain pressure in the oil reservoir, making it necessary to initiate supplemental fluid injection, usually water or natural gas, at some point in the life of the reservoir. Finally, the residual oil remaining behind the advancing water front, is a significant fraction of the original oil in place. This residual oil is often on the order of 25 to 50 percent pore volume in that portion of the reservoir swept by the aquifer waterflood drive. The cause of this high residual oil saturation is due to capillary pressure effects resulting from the fact that oil and water are not miscible.

Wells which are in the path of the advancing water influx are commonly produced until an uneconomic water-oil ratio is reached. When this uneconomic water-oil ratio is obtained, these wells may be abandoned or converted to injection wells. If water influx is not sufficient to maintain reservoir pressure, additional fluid may be injected at the water-oil contact or in other parts of the reservoir. This supplemental injection fluid is normally water or natural gas. In the case of water injection, reservoir performance will be similar to a waterflooded reservoir. If natural gas is injected, performance will be affected by reservoir pressure and composition of the reservoir fluids. If conditions are such that the gas is miscible with the oil, residual oil saturation in the regions of the reservoir swept by gas may be extremely low. Oil displacement from these regions may thus be very efficient. However, injection of natural gas may result in a serious gravity segregation problem. Because of its extremely low density, natural gas will tend to migrate to the structurally high portions of the reservoir and may fail to contact the oil it was intended to displace. For example, natural gas may be injected at the oil-water contact at a pressure sufficient to maintain miscibility of the gas with the oil. It might then be expected that water advancing from .e aquifer into the reservoir will displace a bank of natural gas between the water and oil. The miscibility of the gas in the oil should result in a very low residual oil saturation. In actual practice, however, because of the low density of natural gas, there will be a tendency of the gas to override the oil or percolate upward through the oil. This loss of natural gas in the water-oil contacting phase results in a loss of efficiency of the contact between the gas and oil an a low oil recovery.

Miller, U.S. Pat. No. 3,363,684 teaches the injection of an increased density fluid between the oil-water interface when there is an aquifer encroaching an oil reservoir. The Miller patent relates to a method of improving oil recovery by injecting salt water below the water-oil contact. The salt concentration is such that the density of the brine is much greater than the reservoir oil density. In practicing the application described by Miller, the salt water is pumped down an input well in a continuous quantity so that the reservoir in the vicinity of the input well becomes saturated with the high density brine. It is assumed that the crude oil to be recovered in the reservoir has a density less than that of the original aquifer water, which also has a lesser density than the flooding water being supplied. Therefore, as the high density flooding water is supplied, the oil in the reservoir is displaced and floated to the surface of the newly added flooding water. The oil is floated to the vicinity of a producing well and thereby produced at the surface. This method does not provide for a density of the flooding fluid intermediate between the densities of the aquifer water and reservoir oil and in addition the salt water is not miscible with the oil. Therefore, gravity segregation may still take place and a high saturation of residual oil is left behind. What is desired is a flooding material which is both miscible with the reservoir oil and has a density intermediate between that of the aquifer water and reservoir fluid, so that the driving fluid or aquifer water will not override the injected miscible fluid which in turn will not override the reservoir oil. The intermediate density material will dissolve and swell the reservoir oil and render it more mobile, thereby displacing more of the reservoir oil and leaving less residual oil behind the driven oil bank.

It is an object of this invention to provide an improved method for the miscible displacement of oil from subterranean reservoirs.

It is another object of this invention to provide a method by which an encroaching water aquifer may be used more efficiently to flood an oil reservoir.

It is still another object of this invention to provide an intermediate density miscible fluid zone between an encroaching water aquifer and the oil contained within the oil reservoir so that oil displacement will be efficient and gravity segregation will not inhibit the flooding operation.

It is still another object of the present invention to utilize the unique density characteristics at high pressures of carbon dioxide to overcome the phenomenon of gravity segregation during the influx of a water aquifer upon an oil bearing reservoir and also provide for a miscible displacing fluid to contact the oil contained within said reservoir.

With these and other objects in mind, the present invention is hereinafter set forth with reference to the following description and drawings.

SUMMARY OF THE INVENTION

The objects of the present invention are accomplished by an improved natural flooding process for the recovery of oil of the type wherein a water aquifer is encroaching a reservoir containing oil and drives the reservoir oil to a point where it is removed through a production well to the earth's surface. The improvement comprises introducing a miscible fluid into the reservoir in the vicinity of the water-oil interface and maintaining reservoir conditions of pressure and temperature at which the miscible fluid has a density between that of the reservoir oil and that of the aquifer water. The miscible fluid is driven through the reservoir by the encroaching aquifer water so as to contact the reservoir oil, dissolve in, lower the reservoir oil's viscosity, and drive the reservoir oil to the point of removal to the earth's surface through the production wells. The method provides a process by which the water influx is controlled and improved oil recovery afforded. The method also minimizes both the problems of gravity segregation and high residual oil saturation remaining behind the advancing water front.

BRIEF DESCRIPTION OF THE DRAWING

The present invention is hereinafter described in further detail with particular reference to the accompanying drawing in which.

DETAILED DESCRIPTION OF THE INVENTION

In implementing the present invention, the process is utilized in a reservoir which is exhibiting production by natural water drive. By this procedure, a sample of the reservoir oil is taken to determine the density of the reservoir oil at the reservoir temperature and at the various conditions of reservoir pressure which may be maintained. A pressure is then chosen at which the miscible fluid will be more dense than the reservoir fluid and at the same conditions less dense than the aquifer water. Should the reservoir pressure be at a pressure sufficient to form the intermediate density fluid, no pressure correction is required. If the reservoir pressure is not sufficient to form the intermediate density fluid, it is adjusted to the necessary pressure by introducing a greater quantity of miscible fluid than oil which is produced. This procedure will tend to build the pressure in the reservoir to the desired value. The miscible fluid is then introduced until the appropriate slug of intermediate density fluid has been formed between the reservoir oil and the aquifer water. If necessary the reservoir pressure may be decreased by the reverse procedure of producing more fluid than is injected.

Figure 1:
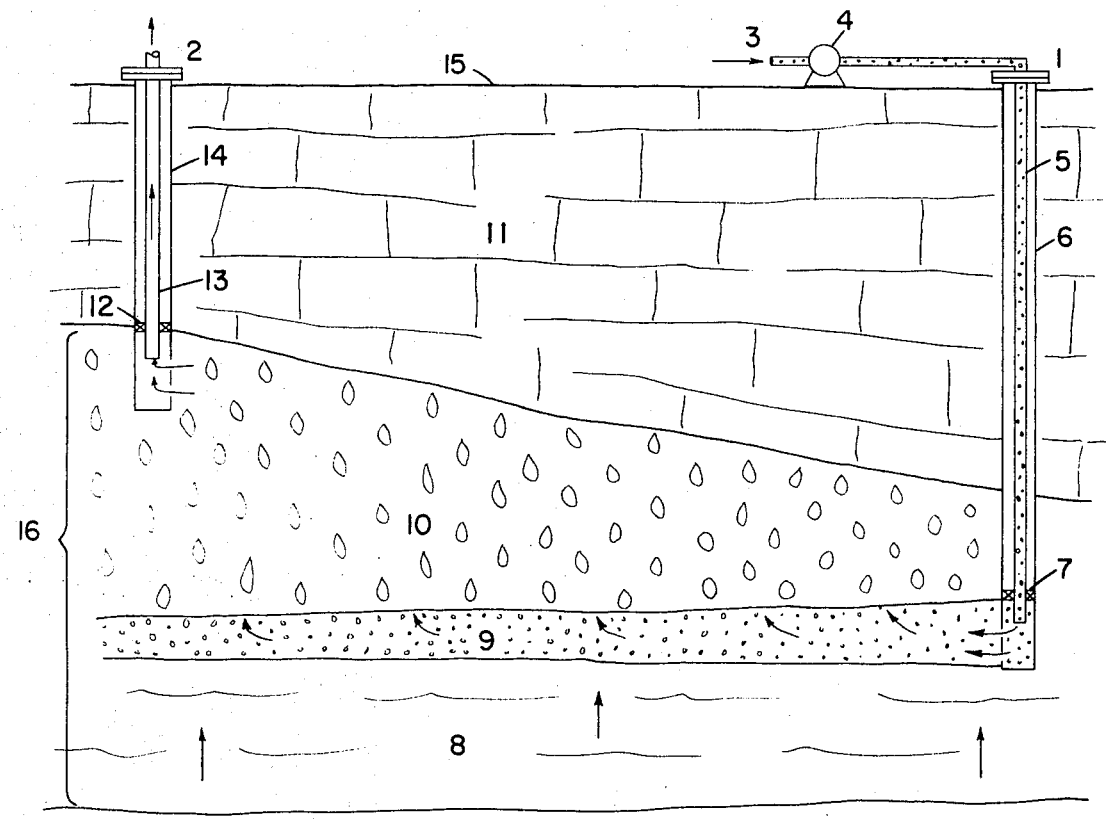
FIG. 1 represents a cross-sectional view of a subterranean oil reservoir with the improved miscible displacement process depicted therein.

The present invention may be more easily understood by referral to one invention embodiment as depicted by FIG. 1. Injection well 1 comprising casing 6 and tubing string 5 is utilized to introduce miscible fluid 3. Miscible fluid 3 is pressured at the earth's surface 15 by compression means 4 through tubing string 5 into reservoir 16 which is overburdened by rock 11. Miscible fluid 3 is introduced at the interface between reservoir oil 10 and encroaching water aquifer 8 to form miscible slug 9 and is restricted to injection into this region by isolation means 7. Miscible slug 9 exhibits a density, at the reservoir temperature and the selected reservoir pressure, intermediate to that of the reservoir oil 10 and water aquifer 8. Therefore, as water aquifer 8 encroaches the oil reservoir 16, it drives miscible slug 9 into contact with the reservoir oil 10. Miscible slug 9 thereby dissolves in and lowers the viscosity of the reservoir oil 10 and renders it more mobile so that it is driven towards the production well 2, comprising casing 14 and tubing string 13. Isolation means 12 are provided to restrict the reservoir fluid flow to the tubing string 13. If not gas cap exists production well 2 will generally be completed in the upper region of the oil reservoir 16, so as to prevent early water breakthrough and a maximum production of reservoir oil 10 is thereby obtained. In addition, as miscible fluid breaks through into the production well 2 occurs, there does not exist the tremendous lifting problems as derived from the case when water enters a producing well. Also, should a miscible gas be utilized in the present invention, the breakthrough of the gas will aid the producing ability of the reservoir fluid as a gas-lift type mechanism will control, thereby affording a free energy source for lifting and producing the reservoir fluids from the reservoir.

As the density of the miscible fluid is intermediate between the aquifer water and reservoir oil, the bank of miscible fluid will tend to remain between the water and oil and there will be no tendency of the fluid to bypass the oil and migrate to the structurally high portions of the reservoir as is the tendency in many of the gas injection processes.

A particular fluid which fits the qualifications of this invention is carbon dioxide. Carbon dioxide is miscible with most reservoir oils at pressures greater than approximately 1,500 pounds per square inch at normal reservoir temperatures. The actual pressure at which carbon dioxide becomes miscible with a given oil must be determined by laboratory tests involving the solubility of the carbon dioxide in the reservoir fluid. To gain further understanding of the present invention the following discussion is presented.

Figure 2:
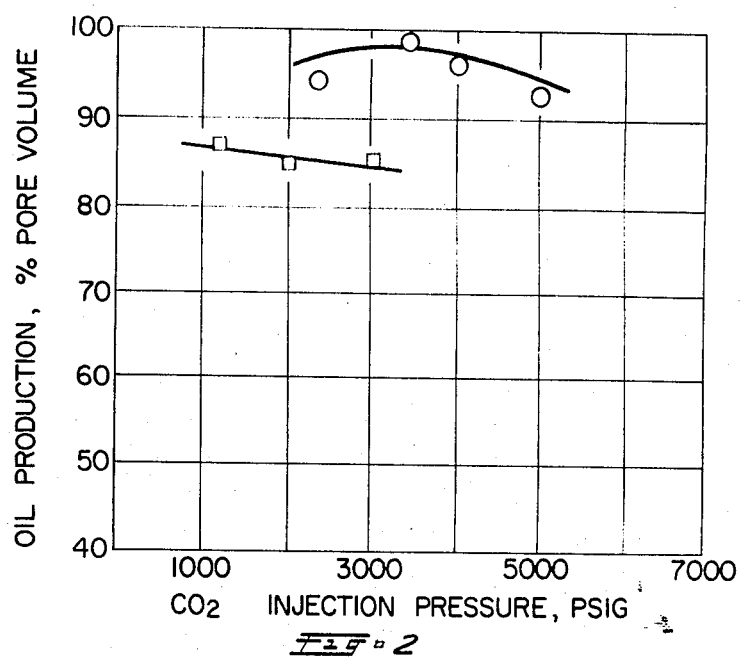
FIG. 2 represents the recovery of crude oil as displaced by the carbon dioxide through injection at various pressures, for test evaluation of the miscible as displacement properties of carbon dioxide.
Figure 3:
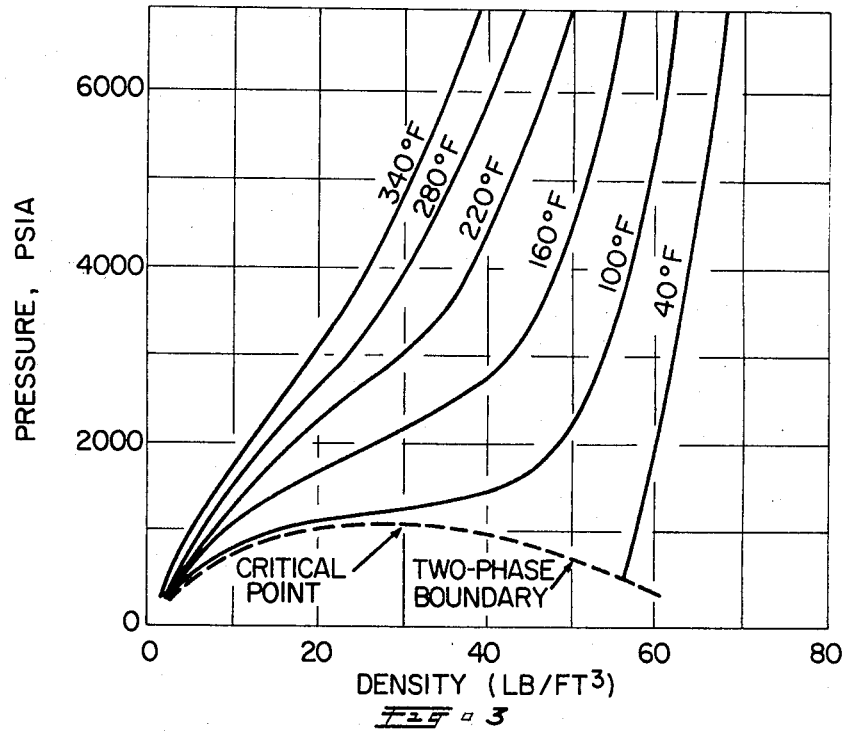
FIG. 3 represents the density of carbon dioxide as a function of pressure and temperature.
Figure 4:
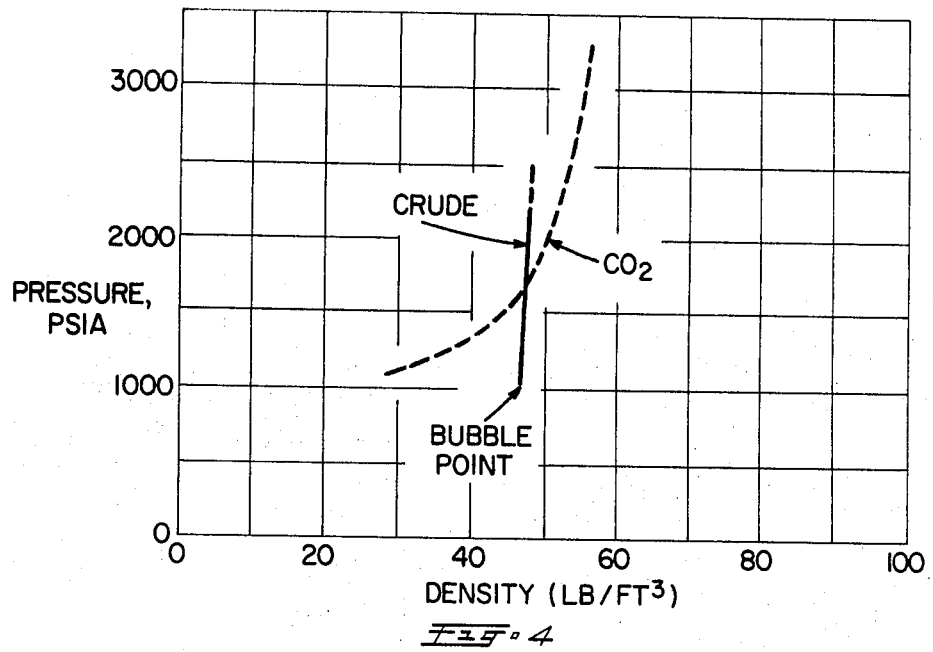
FIG. 4 represents the density exhibited by crude oil saturated by carbon dioxide at various pressures and a temperature of 92° F.
Figure 5:
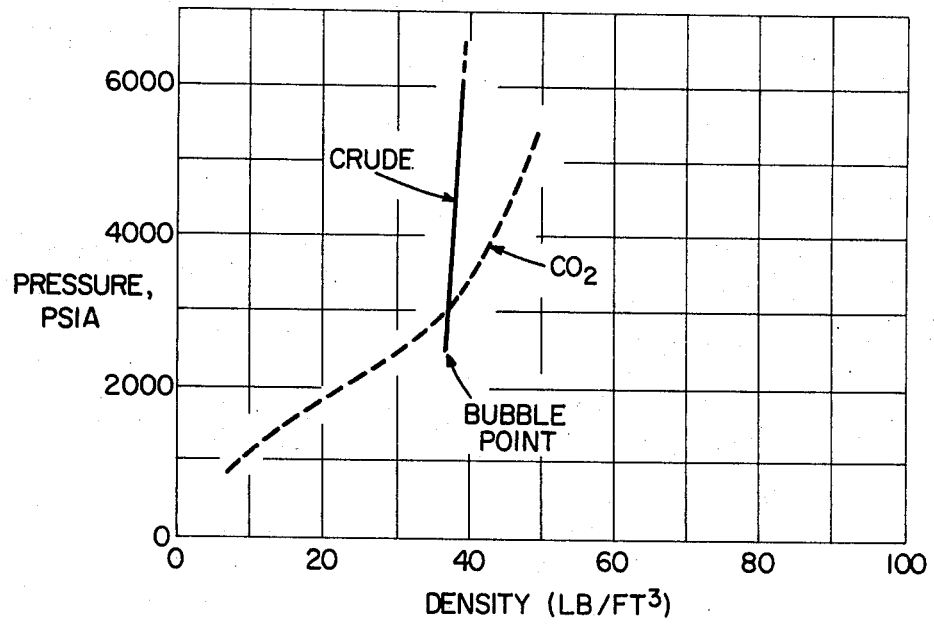
FIG. 5 represents the density exhibited by crude oil ladened with carbon dioxide at various pressures and a temperature of 194° F.
Figure 6:
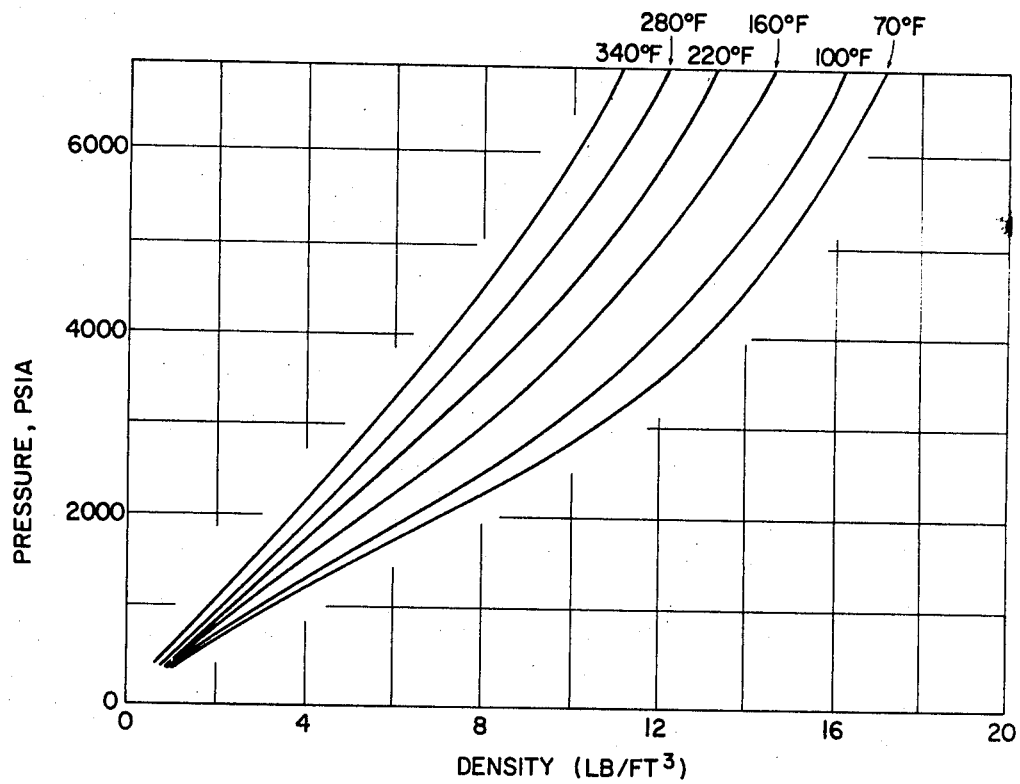
FIG. 6 depicts the density of methane, the principle component of natural gas, as utilized as a reference gas in comparison with the process of the present invention.

Studies have been made in the laboratory with carbon dioxide displacing crude oil from a sand packed stainless steel tube, 42 feet long, three-eighths inch OD, and one-fourth inch ID. The purpose was to obtain data for the evaluation of miscible gas displacement of oil from a reservoir. The tests were made at injection pressures of from about 1,200 to 4,900 psig and at temperatures of 92° F. and 194° F. FIG. 2 represents the recovery of the crude oil displaced by the carbon dioxide at the various pressures mentioned. The upper curve on FIG. 2 represents the crude oil at 194° F, and the lower curve on FIG. 2 represents the recovery of the crude oil at 92° F. It may be seen from the figures that carbon dioxide displaced 85 to 99 percent of the oil in the core during these experiments. In addition to displacing oil efficiently, carbon dioxide often has a density intermediate between that of the water and oil at reservoir conditions. This is shown by FIG. 3, which depicts the density of carbon dioxide as a function of pressure and temperature. Therefore, one can see that carbon dioxide is a most efficient displacement medium and also exhibits under specific conditions of temperature and pressure a density greater than that of many reservoir crude oils and less than that of water, so that the carbon dioxide will float on top of the aquifer water and further drive the contacted reservoir fluid to a production well. To further show the comparison of the density of carbon dioxide with the crude oils used in the displacement study, FIGS. 4 and 5 respectively show the density exhibited by the carbon dioxide with these crude oils at the given temperatures of 92° F. and 194° F. respectively. As seen by FIG. 4, the carbon dioxide is more dense than the reservoir oil at 92° F. when the pressure is greater than 1,700 psi. FIG. 5 depicts that carbon dioxide is more dense than the 194° F. reservoir temperature crude oil at pressures greater than 3,000 psi. In addition, at reasonable reservoir pressures, carbon dioxide is less dense than the reservoir water, which is approximately 65 pounds per cubic foot for brine. For further comparison with other miscible gases, which normally do not exhibit the characteristics of the present invention, one would refer to FIG. 6 which shows the density of methane, the principle component of natural gas. Methane is often injected into a reservoir which has an encroaching water aquifer, however, the methane is normally less dense than most crude oils. Therefore, under some reservoir conditions, natural gas may qualify as an injection fluid for this invention but seldom, if ever, will these conditions occur, for the reservoir fluid must exhibit a very low density, for example less than approximately 15 pounds per cubic foot. Carbon dioxide, however, at most pressures which may be maintained in a given oil reservoir, will exhibit a density intermediate to that of the encroaching aquifer water and reservoir With the wide variety of types of oil reservoirs, there are many possible methods of operation under the present invention. The operating procedure for a given reservoir must be determined with regard to its unique reservoir and aquifer properties. Since capillary pressure effects may cause a gradual, rather than sharp, change in saturation from water to oil at the water-oil contact, there may be some question as to the actual location of the oil-water interface. Likewise, once the water-oil contact has been determined, there may not be a sufficient number of wells in that portion of the reservoir to inject the required volume of carbon dioxide at the rate desired. In such cases, it is sufficient to inject the carbon dioxide in the general vicinity of the water-oil contact. Gravity effects will tend to cause migration of the carbon dioxide towards the water-oil contact. If possible, carbon dioxide should be injected into the oil reservoir rather than the aquifer, to obtain maximum contact of the carbon dioxide with the reservoir oil. Therefore, as the carbon dioxide is injected into the reservoir oil, it will migrate to the water-oil interface and there remain and be driven by the encroaching water through further contact with the reservoir oil and subsequently produced at the production well.

Although carbon dioxide injection will normally be stopped after a sufficient bank has been formed, it may be desirable to continue injection indefinitely. This continued injection will have the effect of retarding or preventing water influx. The prevention of water influx would, therefore, prevent water breakthrough into the production wells which would be especially applicable to deep reservoirs where water production causes economic problems due to high lifting cost.

If reservoir pressure falls below the desired value, it may be necessary to inject additional carbon dioxide or to maintain reservoir pressure by supplemental injection of another fluid, such as water. By this method, the reservoir pressure may be maintained at the pressure necessary to sustain an intermediate density carbon dioxide fluid bank between the reservoir oil and aquifer. Therefore, with further water injection in conjunction with the encroaching aquifer, the pressure may be maintained at which this intermediate density fluid will exist and be driven in a uniform bank to the production well. In another embodiment of the invention the wells in the path of the carbon dioxide bank and aquifer, which will eventually produce carbon dioxide at an uneconomic gas-oil ratio, may be shut in or may be converted, upon reaching that gas-oil ratio, into injection wells for supplemental injection of carbon dioxide or other fluid for furtherance of the process of the present invention. By this method, after the desired bank size has been attained, further oil production will result in water influx. Encroaching water will displace the carbon dioxide bank, which in turn miscibly displaces the crude oil. Production wells in the path of advancing carbon dioxide bank will first produce crude oil, then a mixture of carbon dioxide and crude oil with increasing amounts of carbon dioxide. Initially lifting costs for producing wells at high carbon dioxide-oil ratios would be much less than producing a high water-oil ratio mixture due to induced gas-lift. When the producing carbon dioxide-oil ratio reaches an economic limit, the well is then shut in or converted into a supplemental injection well as mentioned above and the process continued throughout the reservoir.

The present invention in its many embodiments, therefore, provides a highly significant method for the recovery of oil from reservoirs under natural water drive. The improved miscible displacement process is applicable to many reservoirs, some of which were previously determined to be unsuitable for miscible displacement recovery due to high water production in the production wells. The recovery of oil from reservoirs abandoned, or near abandonment, due to high water-oil ratios, and rejected therefore from miscible gas injection are rendered suitable by this process so that the total oil recovery therefrom is enchanced.

The invention has been described herein with respect to particular embodiments and aspects thereof. It will be appreciated by those skilled in the art that various changes and modifications may be made, however, without departing from the scope of the invention.

Therefore, we claim:

1. In a natural flooding process for the recovery of oil of the type wherein a water aquifer is encroaching an oil reservoir containing a plurality of production wells and drives the reservoir oil to a point where it can be removed through one or more production wells to the earth's surface, the improvement which comprises:
   a. introducing a miscible gas into the reservoir in the vicinity of the water-oil interface;
   b. maintain the reservoir at a pressure, relative to reservoir temperature, at which the miscible gas has a density between that of the reservoir oil and that of the aquifer water;
   c. driving the miscible gas through the reservoir by the encroaching aquifer water so as to contact the reservoir oil, dissolve and lower said reservoir oil's viscosity; and
   d. stopping production from those production wells from which an undesirable miscible fluid to reservoir oil ratio exists; and introducing miscible fluid into the wells through which production has been stopped while maintaining the reservoir conditions at a pressure, relative to reservoir temperature, at which the miscible fluid has a density intermediate to that of the uncontacted reservoir oil and that of the aquifer water.

2. The process of claim 1 in which the miscible gas is carbon dioxide.

3. In a natural flooding process for the recovery of oil of the type wherein a water aquifer is encroaching an oil reservoir and drives the reservoir oil to a point where it is removed through a production well to the earth's surface, the improvement which comprises:
   a. introducing a miscible gas into the reservoir in the vicinity of the water-oil interface;
   b. maintaining the reservoir at a pressure, relative to the reservoir temperature, at which the miscible gas has a density between that of the reservoir oil and that of the aquifer water;
   c. driving the miscible fluid through the reservoir by the encroaching aquifer water so as to contact the reservoir oil, dissolve and lower said reservoir oil's viscosity; and
   d. introducing water after the miscible gas introduction in quantities sufficient to maintain the reservoir pressure required to render the miscible fluid density intermediate to that of the reservoir oil and that of the aquifer water.

4. The process of claim 3 further comprising introducing miscible gas into those production wells in which an undersirable miscible gas to reservoir oil production ratio exists and maintaining reservoir conditions of pressure and temperature at which the miscible gas has a density intermediate to that of the reservoir oil and that of the aquifer water.

5. The process of claim 4 in which the miscible gas is carbon dioxide.

* * * * *